United States Patent [19]

Betend-Bon

[11] Patent Number: 5,621,198
[45] Date of Patent: Apr. 15, 1997

[54] SAFETY DEVICE FOR A MOBILE ELECTRIC UNIT AND ELECTRIC BARBECUE FITTED WITH THIS DEVICE

[75] Inventor: Alain Betend-Bon, Annecy, France

[73] Assignee: SEB S.A., Selongey, France

[21] Appl. No.: 431,850

[22] Filed: May 1, 1995

[30] Foreign Application Priority Data

May 6, 1994 [FR] France ................... 94 05618

[51] Int. Cl.⁶ .............. F24C 7/08; H01H 3/16; H01H 13/18; H05B 3/02
[52] U.S. Cl. ............. 200/61.58 R; 200/332; 219/507
[58] Field of Search ............... 200/52 R, 61.41, 200/61.42, 329–332.2, 50.01–50.4, 61.58 R, 333, 334; 219/450, 517, 518, 509, 507, 508

[56] References Cited

U.S. PATENT DOCUMENTS

| | | | |
|---|---|---|---|
| 4,145,600 | 3/1979 | Walter et al. | 200/61.58 R X |
| 4,164,644 | 8/1979 | Remsnyder | 219/518 X |
| 4,214,150 | 7/1980 | Cunningham | 200/85 A X |
| 4,577,181 | 3/1986 | Lipscher et al. | 200/85 R X |
| 5,294,779 | 3/1994 | Miquelot | 219/518 X |

FOREIGN PATENT DOCUMENTS

| | | | |
|---|---|---|---|
| 2069677 | 9/1971 | France | H01H 15/00 |
| 3430878 | 3/1986 | Germany | A47J 37/04 |
| 1019921 | 2/1966 | United Kingdom | H01H 3/16 |
| WO89/03582 | 4/1989 | WIPO | H01H 9/22 |

Primary Examiner—J. R. Scott
Attorney, Agent, or Firm—Young & Thompson

[57] ABSTRACT

Safety device for an electric part mobile relative to a complementary unit cooperating in use with the electric part in a close together position. The safety device includes a system for controlling operation of the electric part movable between an on position and an off position and a system for sensing the position of the electric part relatively near or relatively far away from the complementary unit. A single switch has a connection position in which the electric element is connected to an electric power supply and a disconnection position in which the electric element is disconnected from the electric power supply. The switch is in the disconnection position if the control system is in the off position or if the sensing system detects the position of the electric element relatively far away from the complementary unit.

6 Claims, 3 Drawing Sheets

SAFETY DEVICE FOR A MOBILE ELECTRIC UNIT AND ELECTRIC BARBECUE FITTED WITH THIS DEVICE

BACKGROUND OF THE INVENTION

1. Field of the Invention

The present invention concerns a safety device for a mobile electric unit.

It also concerns an electric barbecue including an electric element fitted with this device.

2. Description of the Prior Art

Many devices have electric parts which are removable to make cleaning the body of the device easier. For safety reasons, it is important to ensure that the electric power supply is disconnected from these removable parts when they are not in their normal position of use. This implies the provision of a safety device which prevents the user switching on the device when the electric parts are not in place on the body of the device.

The prior art includes safety devices fitted between the electric power supply means and the on/off switch of the electric parts. Such devices entail the use of two switches connected in series, each switch being controlled independently, either by the user or by means for sensing the position of the electric part relative to the body of the device.

Existing safety devices therefore have the drawback of being costly to manufacture and of increasing the risk of breakdown of the electric device.

An object of the present invention is to overcome the aforementioned drawbacks and to propose a low-cost safety device which ensures good protection of the user.

SUMMARY OF THE INVENTION

The present invention consists in a safety device for an electric part mobile relative to complementary means cooperating in use with said electric part in a relatively near position, said device comprising means for controlling operation of said electric part movable between an on position and an off position, means for sensing the position of said electric part relatively near or relatively far away from said complementary means, and a single switch having a connection position in which said electric element is connected to electric power supply means and a disconnection position in which said electric element is disconnected from said electric power supply means, said switch being located in said disconnection position if said control means is located in the off position or if said sensing means detect the position of said electric element relatively far away from said complementary means.

In accordance with the invention, a single switch is operated by the on/off control means of the device and the means for sensing the position of the electric part relative to the device. The electric means can only be switched on if the control means is located in the on position and if the electric part is in its normal position of use.

The device of the invention is therefore extremely safe to use because a two-fold action on the switch is required to connect the electric part to the electric power supply means.

In one advantageous embodiment of the invention, said switch includes a contact actuating member which projects in said disconnection position and is retracted in said connection position and lever means is disposed in front of said contact actuating member for displacing said contact member into said retracted position when said control means is located in said on position and when said sensing means detects the position of said electric element relatively near said complementary means.

The control means and the sensing means accordingly operate the same contact actuating member via the lever means.

In another aspect the invention consists in an electric barbecue comprising a base and an electric element removably mounted on said base, said electric element being provided with a safety device as defined hereinabove and said complementary means comprising said base.

Consequently, as soon as the electric element is removed from the base, for example to facilitate cleaning of the latter, the safety device of the invention prevents switching on of the electric element and so protects the user totally.

Other advantages and features of the invention will emerge further from the following description which is given by way of non-limiting example.

DETAILED DESCRIPTION OF THE PREFERRED EMBODIMENTS

For a better understanding of the invention, an application of the safety device to an electric barbecue will be described, by way of an illustrative example only.

Figure 1:
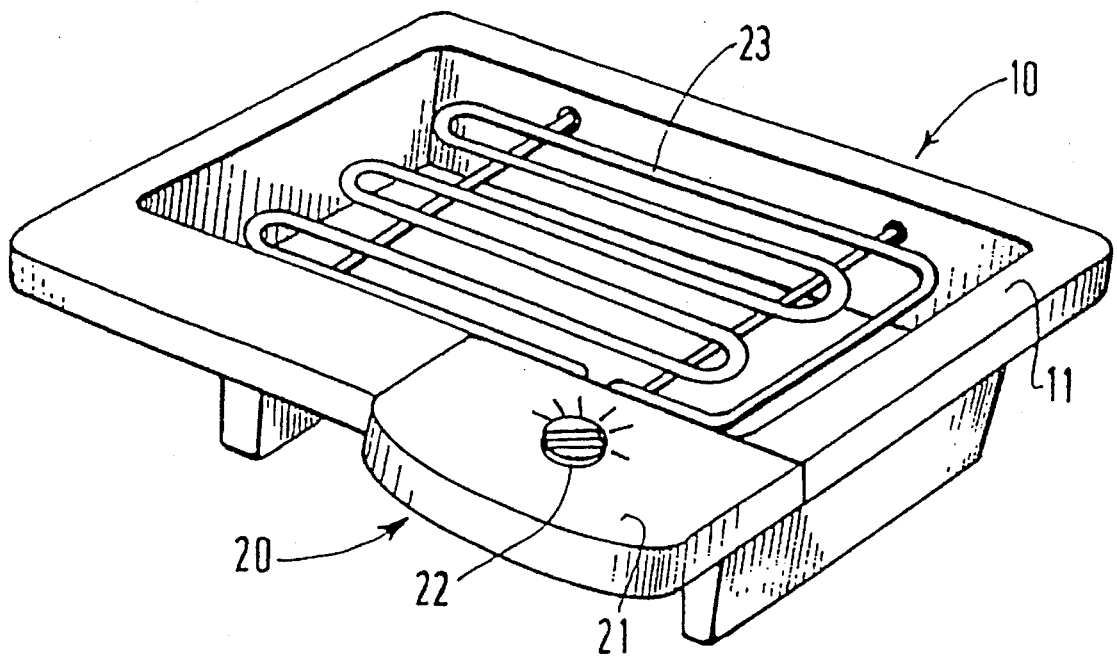
FIG. 1 is a perspective view of an electric barbecue of the invention.

Referring first to FIG. 1, an electric barbecue comprises a base 11 and an electric element 23 removably mounted on the base 11.

In a device of this kind it is very advantageous to be able to remove the electric element to facilitate cleaning of the base 11.

A safety device, described hereinafter in more detail, is fitted to the electric element 23. The safety device 20 is housed in a plastic or aluminum casing 21.

Figure 2:
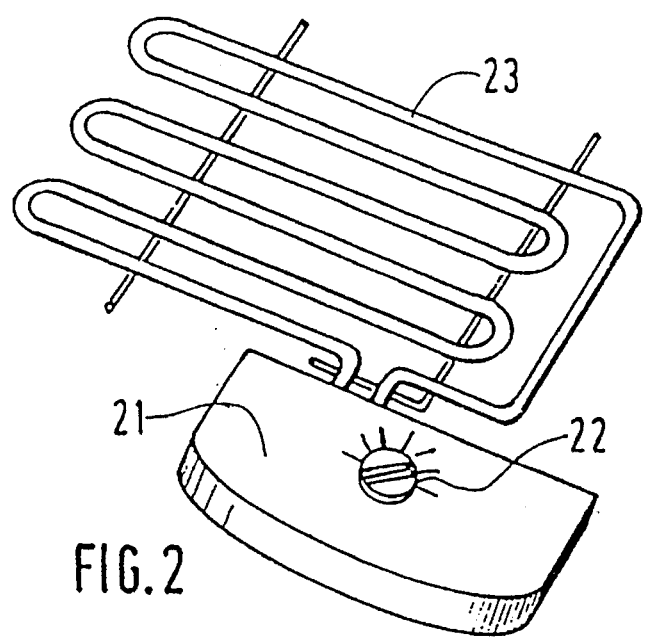
FIG. 2 is a perspective view of an electric element fitted with a safety device of the invention.

As can be seen more clearly in FIG. 2, the electric element 23 and the safety device 20 are removable from the remainder of the device and in particular from the base 11.

The construction of a first embodiment of safety device of the invention will be described first, with reference to FIG. 3A.

This safety device comprises means 33 controlling the operation of the electric element 23 movable between an on position and an off position. It also comprises sensing means 31 for sensing whether the electric element 23 is relatively near or relatively far away from the complementary means 11.

In accordance with the invention, the safety device comprises a single switch 34 having a connection position and a disconnection position.

In a manner that is known in itself, electric conductors 37, 38 connect the electric element to a power supply (not shown).

The switch 34 comprises a contact actuating member 35 which projects in the disconnection position and is retracted in the connection position.

The contact actuating member 35 is spring-loaded into the projecting position.

Lever means 30 are provided in front of the contact actuating member 35 for moving the contact actuating member 35 to its retracted position if and only if the control means 33 is located in the on position and the sensing means 31 sense that the electric element 23 is relatively near the complementary means 11. The latter can comprise the base 11 of the barbecue as shown in FIG. 1.

The control means 33 and the sensing means 31 are adapted to move respective ends 32, 31 of the lever means 30.

The sensing means 31 comprise one end 31 of the lever means 30, this end 31 being moved by the complementary means 11 when the electric element 23 is relatively near the complementary means 11.

Accordingly, when the electric element 23 is in the operating position the complementary means 11 are in contact with the end 31 of the lever means 30 and push them towards the contact actuating member 35 of the switch 34.

The control means 33 comprise a cam rotating about a rotation axis 33a. The cam 33 has a first peripheral portion 33b in contact with one end 32 of the lever means 30 when the control means 33 is located in the off position. A second peripheral portion 33c at a greater distance from the rotation axis 33a than the first peripheral portion 33b is in contact with the end 32 of the lever means 30 when the control means 33 is located in the on position.

The control means 33 can be operated manually by the user by means of a control button 22 shown in figure 1 disposed on the casing 21 housing the safety device 20.

The control means 33 can instead comprise a cursor moving in translation or any other mobile adjuster means.

The operation of the safety device described above will now be explained with reference to FIGS. 3A, 3B, 3C and 3D in the case of an electric element fitted to a barbecue.

Figure 3A:
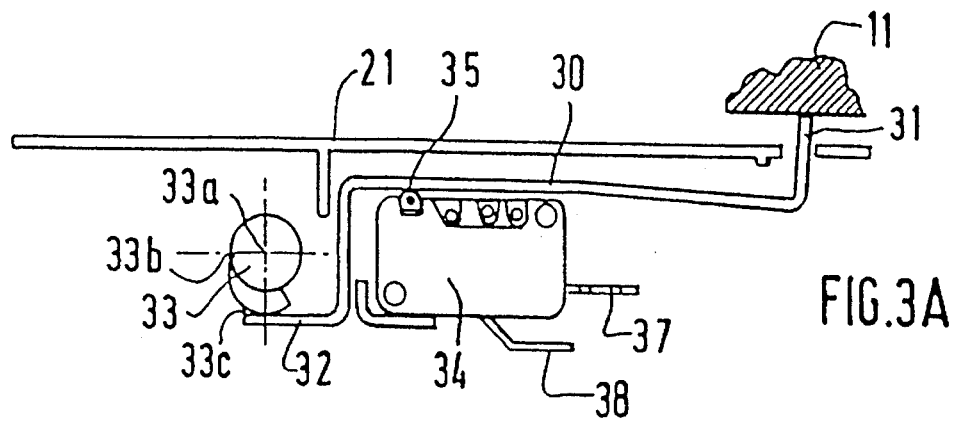
FIGS. 3A, 3C and 3D are diagrams showing the operation of a first embodiment of safety device of the invention.

FIG. 3A shows the safety device when the electric element 23 is switched on, i.e. supplied with power.

The ends 31 and 32 of the lever means 30 are pushed back at the same time by the base 11 and by a part 33c of the cam 33 relatively far from the rotation axis 33a of the cam 33.

The lever means 30 are thus held in a position in which the contact member 35 is in its retracted position.

Figure 3B:
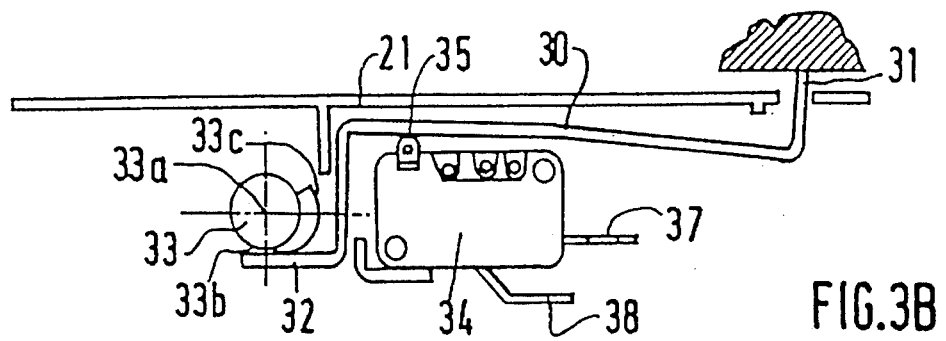

FIG. 3B shows the safety device 20 when the electric resistance 23 is in its operative position in the device but switched off. The cam 33 is in a position in which a peripheral part 33b relatively near the rotation axis 33a is in contact with the end 32 of the lever means 30. The cam 33 no longer applies pressure to the end 32 and the contact actuating member 35 is in its projecting position, i.e. the switch 34 cuts off the supply of power to the electric element 23.

Figure 3C:
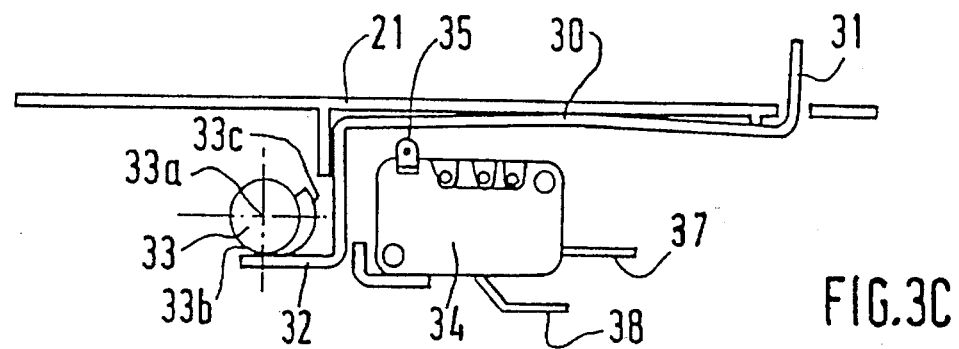
Figure 3D:
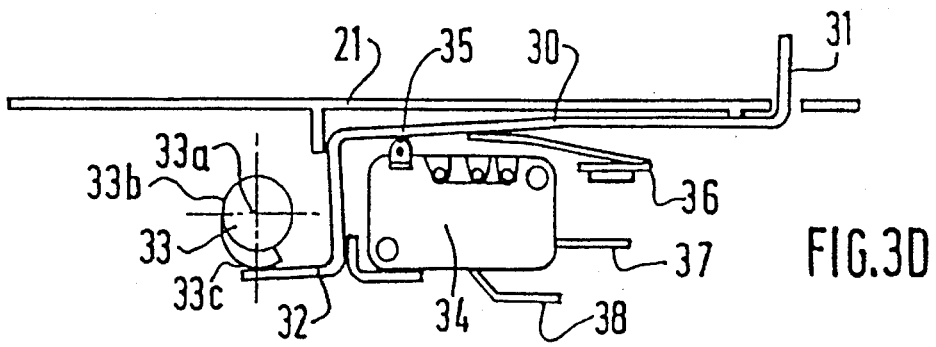

FIGS. 3C and 3D show the operation of the safety device 20 when the electric element 23 is not in its operating position on the base 11 of the barbecue 10.

In FIG. 3C, the control means 33 is located in the off position, no action is exerted on the ends 31 and 32 of the lever means 30 and the contact actuating member 35 remains in its projecting position, i.e. the switch 34 is in its disconnection position.

In FIG. 3D the control means 33 is located in its on position and a portion 33c of the cam 33 relatively far from the rotation axis 33a is in contact with the end 32 of the lever means 30. This situation can arise if the user has unintentionally operated the control button 22 although the electric element 23 is not in place in the barbecue 10.

As the end 31 of the lever means 30 is not in contact with the base 11 of the device 10, the level means do not apply any pressure to the contact actuating member 35 and the latter remains in its projecting position. Accordingly no power is supplied to the electric element 23, avoiding any risk of the user being burned or any other accident occurring.

The embodiment described above has the advantage of using control means 33 and sensing means 31 which must exert a positive action on the ends 31 and 32 of the lever means 30 for the electric element 23 to be supplied with power.

As shown in FIG. 3D, the safety device 20 can also comprise spring means 36 for spring-loading the lever means 30 into a position relatively far from the contact actuating member 35. However, the spring means 36 may be superfluous if the lever means 30 are sufficiently resilient to return to a position relatively far from the contact actuating member 35.

Accordingly, according to the invention, the switch 34 connects an electric element 23 to the electric power supply means if and only if the element is in its operative position in the device and the control means 33 are in their on position.

Other embodiments of the invention will be described hereinafter with reference to FIGS. 4 to 6.

Components common to the previous embodiment are identified by the same reference numbers in these figures and are not described again.

Figure 4:
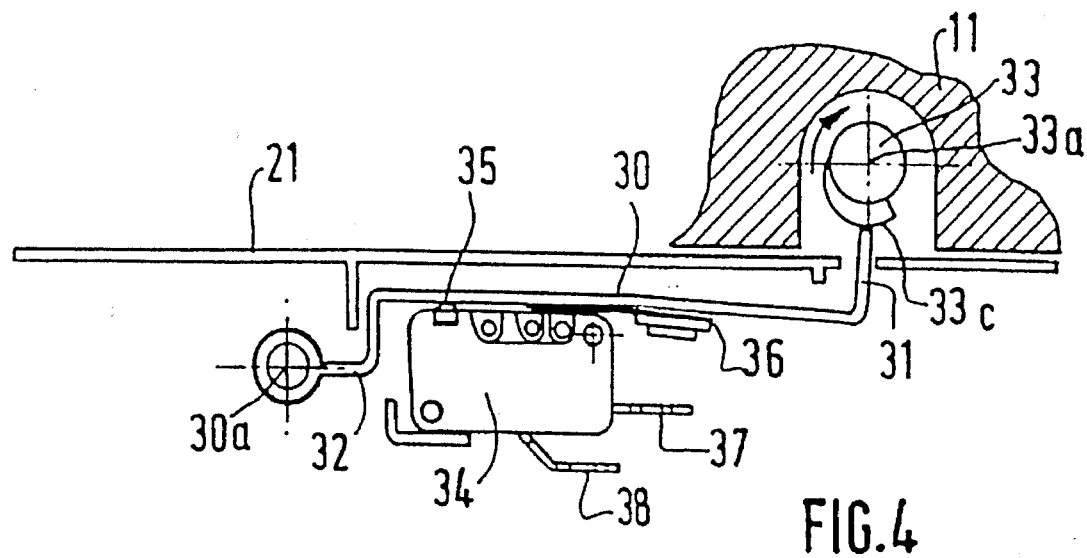
FIG. 4 ms a diagram showing a second embodiment of safety device of the invention.

Referring to FIG. 4, the control means 33 and the sensing means 31 move a common end 31 of the lever means 30.

The other end 32 of the lever 30 is mounted to rotate about a pivot axis 30a.

The control means 33 comprise a rotary cam 33 mounted directly on the body of the device 11 rather than on the casing 21.

The contact actuating member 35 of the switch 34 is located in its connection position only when the portion 33c farthest from the rotation axis 33a of the cam 33 is in contact with the end 31 of the lever 30.

Figure 5:
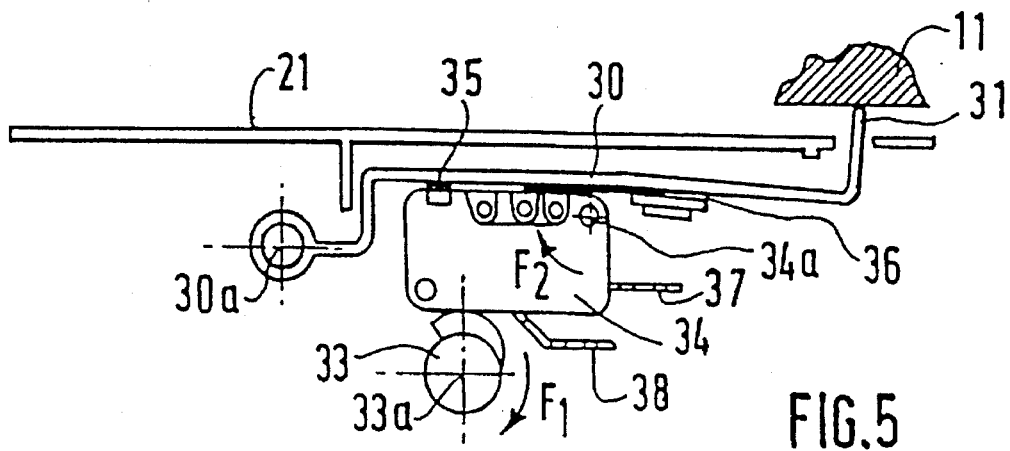
FIG. 5 is a diagram showing a third embodiment of safety device of the invention.

In the embodiment shown in FIG. 5 the control means 33 for displacing the switch 34 about a pivot axis 34a between a position relatively far from the lever means 30 when the control means 33 is located in the off position and a position relatively near the lever means 30 when the control means 33 is located in the on position.

For the contact actuating member 35 to be in its retracted position the end 31 of the lever 30 must be moved towards the switch 34 by the complementary means 11 and at the same time the rotary cam 33 forming the control means 33 must be pivoted into the on position (in the direction of the arrow F1 in FIG. 5) so as to pivot the switch 34 towards the lever 30 (in the direction of the arrow F2).

Figure 6:
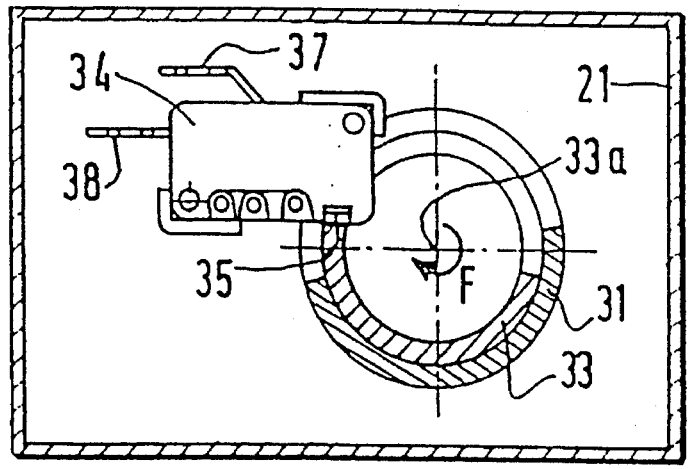
FIG. 6 is a diagram showing a fourth embodiment of safety device of the invention.

In the embodiment of the invention shown in figure 6 the sensing means 31 comprise a first cam 31 and the control means 33 comprise a second cam 33.

The two cams 31 and 33 are concentric and rotate together about an axis 33a.

The cam 33 can be rotated by a ramp surface attached to the base 11 of the barbecue.

The cam 31 is conventionally attached to a manual control knob projecting from the casing 21.

In use, when the user places the electric element fitted with the safety device on the base 11, complementary means such as a ramp surface act on the cam 31 and move the two cams 31 and 33 through a predetermined angle, in the order of approximately 15°, in the direction of the arrow F, against the return force of a spring.

Then, when the user turns the control button, also in the direction of the arrow F, the cams 31 and 33 are pivoted by a further angle such that the cam 33 bears on the contact actuating member 35 of the switch 34 and thereby switches on the electric element.

If the electric element is not in place on the base 11, the return force due to the aforementioned spring rotates both cams 31 and 33 in the direction opposite the arrow F.

When the user operates the control button attached to the cam 33, the cams 31 and 33 rotate in the direction of the arrow F by a maximum angular displacement.

This is determined beforehand so that the movement of the cam 33 stops before the latter comes into contact with the contact actuating member 35 of the switch 34.

The switch 34 can therefore be turned on only by combined rotation of the cams 31 and 33 by the ramp surface attached to the base 11 and by the control button.

Of course, many modifications can be made to the embodiments of the invention described hereinabove without departing from the scope of the invention.

For example, the safety device could be mounted on a part including an electric motor, for example, adapted to move members such as the blades of a liquidizer or the beaters of a mixer, for example, so that the motor can be switched on only if the above components are fitted.

The electric element could equally well be merely mobile between an operating position and an inoperative position, without being removable as such.

In the embodiment of the invention shown in figure 3A the sensing means 31 comprise one end 31 of the lever means 30 projecting from the casing 21 in which the safety device is housed.

In a similar way, the base 11 could include a projecting portion, the casing 21 having an opening facing this projecting portion of the base 11 so that the latter can enter the casing 21 and push back the end 31 of the lever means 30. In this embodiment, no member projects from the casing 21 housing the safety device 20, preventing the user inadvertently depressing the projecting end 31 with the attendant risk of the switch being moved to its connection position.

There is claimed:

1. An electric barbecue comprising a base, an electric heating element movable relative to said base and a safety device for controlling said electric heating element, wherein said safety device comprises means for controlling operation of said electric heating element between an on position and an off position, means for sensing the position of said electric heating element relatively near or relatively far away from said base, and a single switch controlled by both said control means and said sensing means, said single switch having a connection position in which said electric heating element is connected to electric power supply means and a disconnection position in which said electric heating element is disconnected from said electric power supply means, said switch being located in said connection position when said control means is in the on position and when said sensing means detect the position of said electric heating element relatively near said base, and wherein the safety device is housed in a casing and comprises pivoting lever means controlling said single switch between said connection and disconnection positions, the sensing means comprising one end of said lever means projecting from the casing, said one end being displaced by the base when the electric heating element is in said position relatively near said base.

2. Device according to claim 1, wherein said electric element is removable from said base.

3. Device according to claim 1, wherein said control means displace the other end of said lever means.

4. Device according to claim 3, wherein said control means comprise a cam rotating about a rotation axis and having a first peripheral portion in contact with said other end of said lever means when said control means is in said off position and a second peripheral portion at a greater distance from said rotation axis than said first peripheral portion in contact with said other end of said lever means when said control means is in said on position.

5. Device according to claim 1, wherein said control means and said sensing means move the same end of said lever means.

6. Device according to claim 1, wherein said control means moves said switch about a pivot axis between a position relatively far from said lever means when said control means is located in said off position and a position relatively near said lever means when said control means is located in said on position.

* * * * *